United States Patent [19]

Lasalle

[11] 3,732,008

[45] May 8, 1973

[54] APPARATUS FOR THE PRODUCTION OF ORTHOPHOTOPLANS

[75] Inventor: Paul Lasalle, Sevres, France

[73] Assignee: Eugins Matra, Paris, France

[22] Filed: Sept. 10, 1971

[21] Appl. No.: 179,419

[30] Foreign Application Priority Data

Sept. 16, 1970 France....................................7033616

[52] U.S. Cl..............................355/22, 95/18 P, 353/7

[51] Int. Cl...................................................G03b 27/32

[58] Field of Search......................355/22, 52; 95/18 P; 353/6, 7, 30; 356/12

[56] References Cited

UNITED STATES PATENTS 3,583,809 6/1971 Dubuisson.............................353/6 X 3,602,592 8/1971 Collins...................................355/22 X

*Primary Examiner*—Richard L. Moses

*Attorney*—Waters, Roditi, Schwartz & Nissen

[57] ABSTRACT

The apparatus comprises an optical projection device for a pair of stereoscopic photographs and a support for a sensitive surface, a receiving device and a device for the successive exposure of adjacent zones of the sensitive surface. The receiving device comprises two distinct visible marks M*a*, M*b*. Optical means with two sighting axes enable a stereoscopic reconstitution of a space mark and of a portion of the subject. The mark M*a* is constituted by an aperture. The apparatus is useful for producing orthophotoplans in colors.

10 Claims, 3 Drawing Figures

APPARATUS FOR THE PRODUCTION OF ORTHOPHOTOPLANS

The invention relates to apparatus for producing orthophotoplans. Such apparatus comprises:

- an optical projection device for a pair of stereoscopic photographs of the subject, comprising two centers of projection,
- a support, adapted to bear a sensitive surface, the distance of this support to the projection device being adjustable,
- a receiving device for images of portions of the photographs corresponding to a same portion of the subject, which receiving device is situated in the vicinity of the support, between the latter and the projection device, and is adapted to be moved with the support, and
- a successive exposure device for adjacent zones of the sensitive surface, comprising an aperture provided in the receiving device.

The invention relates more particularly, because it is in this case that this application seems to offer the most advantage, but not exclusively, among these apparatuses, to those intended for the production of orthophotoplans in colors and with enlargements less than those normally used.

In certain apparatus of the prior art, for producing orthophotoplans, especially in apparatus for the production of orthophotoplans in colors, relatively complicated mechanisms difficult to produce are used. The planimetric accuracy also requires to be improved.

It is a particular object of the invention to render the abovesaid apparatuses such that they respond better to the various exigences of practice than hitherto and especially so that they have a great simplicity of execution and of production whilst enabling the production of orthophotoplans in colors.

According to the invention, an apparatus for producing orthophotoplans, of the type specified above, is characterized by the fact that, on one hand, the receiving device comprises two distinct, visible marks, separated from one another in a direction parallel to the line joining the projection centers, the midpoints of the marks being aligned parallel to the projection centers, one of these marks being constituted by the abovesaid aperture, that on the other hand, the separation of the projection centers, for a given enlargement, is equal to a distance depending on the conditions of recording the photographs increased by the separation of the marks and, that lastly, optical means, with two sighting axes of which the separation depends on that of the said marks, are provided to enable, from the observation of the marks and of the projected images, a stereoscopic reconstitution of a space mark and of a portion of the subject, the assembly being such that, at the moment when there is coincidence, in stereoscopic vision, between the portion of the subject and the space mark, the projected images coincide respectively with the marks and are hence separated, due to which the sensitive surface is only printed by the image coincident with the abovesaid aperture.

Preferably, the projection device is arranged to provide polychromatic light beams. Under these conditions, with photographs in colors and a surface sensitive to colors, it is possible to obtain orthophotoplans in colors.

Advantageously, the second mark is constituted by an imitation opening of identical appearance with the real aperture.

The invention consists, apart from the features mentioned above, of certain other features which are preferably used at the same time and which will be more explicitly considered below, with regard to a preferred embodiment of the invention which will now be described in more detailed manner with reference to the accompanying drawings, but which is in no way limiting.

Figure 3:
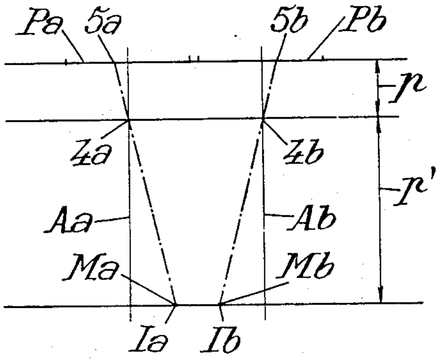

FIG. 3, lastly, is a diagram of the principle enabling the possibilities of an apparatus according to the invention to be understood.

Figure 1:
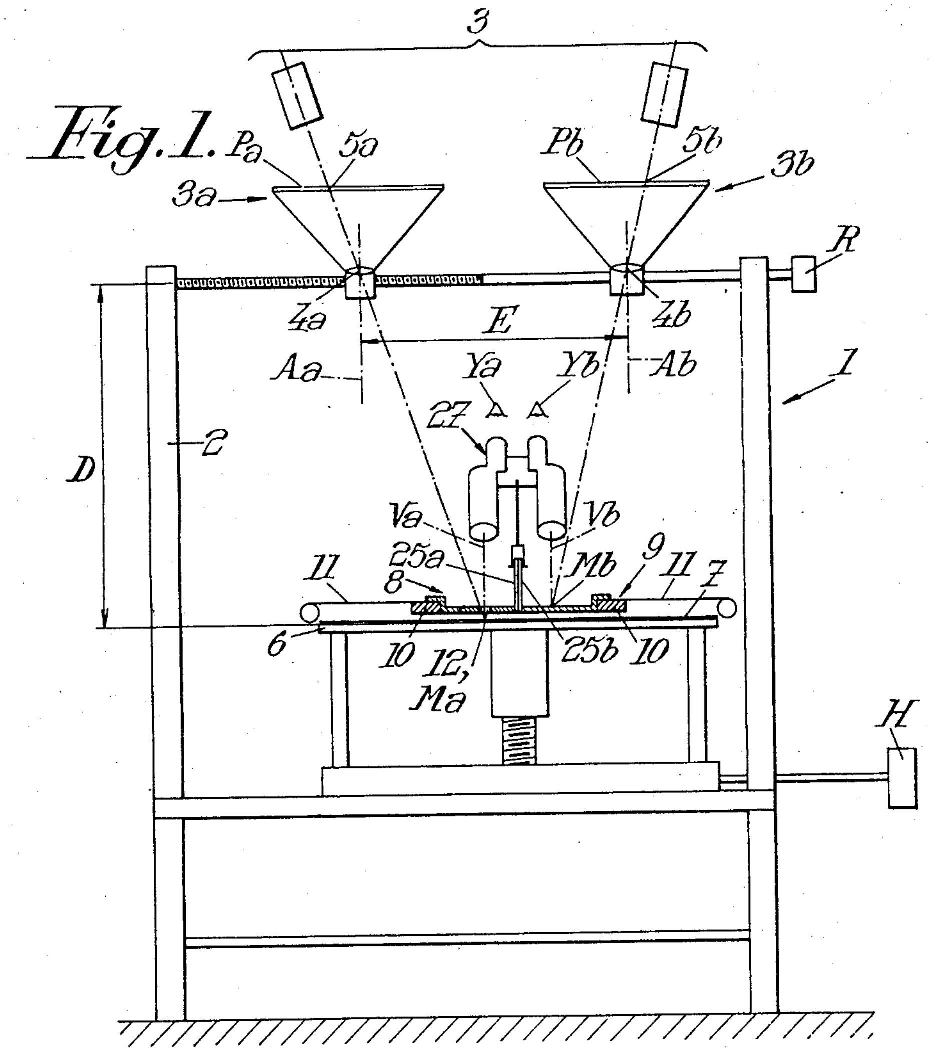
FIG. 1 is a diagrammatic view of one embodiment of an apparatus according to the invention.

Referring to FIG. 1, it is seen that the apparatus 1 for producing orthophotoplans comprises a frame 2 supporting an optical projection device 3 for a stereoscopic pair of photographs P*a*, P*b*.

The device 3 comprises two projectors 3*a*, 3*b* of which the spacing E is adjustable by means of adjusting means R. These projectors 3*a*, 3*b* assume respectively centers of projection 4*a*, 4*b*.

The assembly is such that the image of a point or of a zone 5*a*, or 5*b* of the plate P*a*, P*b* is formed on the line joining the point 5*a* or 5*b* to the corresponding projection center 4*a* or 4*b*. The assembly is such also that the angle formed by the line joining the points 5*a* or 5*b* to the projection center 4*a* or 4*b* with the axis of projection A*a* or A*b* is equal to that which was formed, at the moment taking each photograph, between the line joining the points 5*a* or 5*b* to the nodal point of the taking objective and the sighting axis of this objective. Since, at the moment of photographing, the object is at a practically infinite distance from the objective, the photographs P*a* or P*b* occur in the focal plane of the objective. On restitution, the distance between the projection centers 4*a*, 4*b* and the photographs P*a*, P*b* must hence be equal to the focal length distance of the taking objective.

The apparatus 1 comprises also a support constituted by a table 6 of which the distance D to the projection device is adjustable by a control H. The table 6 bears a sensitive surface 7 adapted to be exposed by the light issuing from the projector 3*a*.

The apparatus 1 comprises also a receiving device 8 of the images of portions of the photographs P*a*, P*b* corresponding to a same portion of the subject.

This receiving device 8 is situated in the vicinity of the table 6 between the latter and the projection device 3 and it is adapted to be moved with the table 6 to approach or recede from the projection device 3.

The apparatus 1 comprises lastly an exposure device 9 for successively exposing adjacent zones of sensitive surface 7. This device 9 comprises slides 10, on which the receiving device 9, is mounted enabling the latter to be moved along a first direction parallel to the plane of the table 6. The slides 10 are adapted to be moved in a second direction at right angles to the first and parallel to the plane of the table 6.

The device 9 also comprises means adapted to mask the portions of the sensitive surface 7 which must not be exposed, these means comprising essentially shutters 11 covering the whole zone of the sensitive surface 7 situated outside the perpendicular projection of the contour of the device 8 on the table 6. The shutters 11 are mounted so as to be wound or unwound automatically on movements of the device 8 in a plane parallel to that of the table 6.

The exposure device 9 comprises, in common with the receiving device 8, an aperture 12 provided in the latter, enabling exposure of the sensitive surface 7 to at least one light beam coming from the projector 3*a* or 3*b*.

The receiving device 8 comprises two distinct visible marks M*a*, M*b* separated from one another in a direction parallel to line joining the projection centers 4*a*, 4*b*. The midpoints 13*a*, 13*b* of the marks M*a*, M*b* are aligned parallel to the projection centers 4*a*, 4*b*. One of the marks M*a* is constituted by the abovesaid opening 12.

Figure 2:
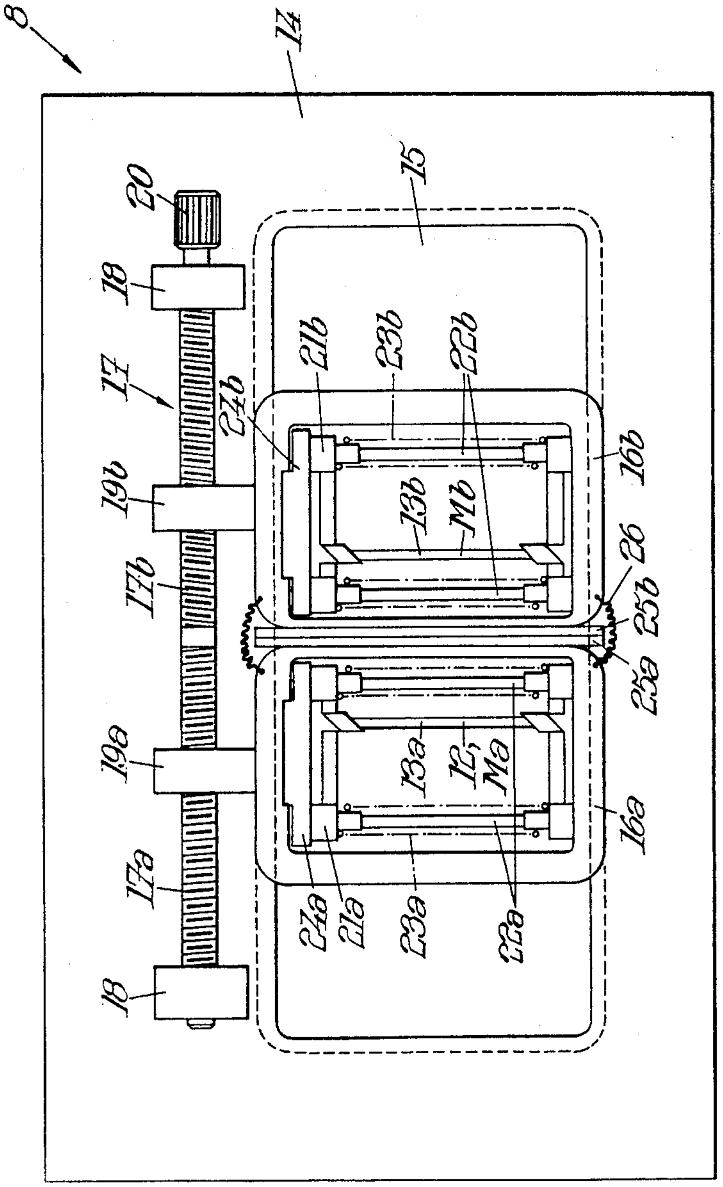
FIG. 2 shows in plan view, partially, the receiving device for the images and the exposure device of the embodiment of FIG. 1.

More particularly, as appears in FIG. 2, the receiving device 8 comprises a block 14, in the form of a rectangular parallelopiped in which is arranged a window 15 with a rectangular contour parallel to that of the block 14.

Two screens 16*a*, 16*b* or "rings" of substantially rectangular contour, of identical dimensions, extending over the whole of the width of the window 15 and over a fraction only of its length, are provided to receive the images of portions of photographs P*a*, P*b* corresponding to a same portion of the subject. The screens comprise a hollow central portion, in which are provided the marks M*a*, M*b* substantially in contact with the surface 7.

Advantageously, adjustment means for the separation of the screens 16*a*, 16*b* are provided and comprise for example a rod 17 adapted to turn in bearings 18 rigidly fixed to the block 14, and of which one half 17*a* is provided with a thread whose pitch is oriented in one sense and the other half 17*b*, with a thread whose pitch is oriented in the opposite sense. Each half 17*a*, 17*b* is adapted to cooperate with a corresponding nut 19*a*, 19*b*, rigidly fixed respectively to the screens 16*a*, 16*b*. The rod 17 comprises, at one end, a knob 20 enabling its rotation to be actuated and, thus, separation of the screens 16*a* 16*b*.

The aperture 12 is provided in the screen 16*a* and constituted by a slot with parallel edges of which the width and the length can be adjusted. The adjustment of the length of the slot is obtained by moving a moveable train 21*a* mounted on guide rods 22*a* parallel to the direction of the large dimension of the slot 12, against the action of the elastic return means 23*a*. To maintain the train 21 in its new position, a wedge [not shown] is arranged between the said train and a stop 24*a*.

The screen 16*b* is similar to the screen 16*a*, but arranged symmetrically with respect to a plane at right angles to the axis of the rod 17. The mark M*b* is advantageously constituted by an imitation slot having the same appearance as the real slot 12 and of which the dimensions are adjustable under the same conditions as the latter.

Separation means, adapted to prevent, on each screen 16*a*, 16*b* and on the marks M*a*, M*b*, overlapping of images coming from the two photographs P*a*, P*b*, are provided. They comprise a shutter in two portions 25*a*, 25*b*, opaque, connected respectively to the screens 16*a*, 16*b*. The planes of these screens are located at right angles to the line joining the midpoints 13*a*, 13*b* of the marks. The shutter is arranged between the marks M*a*, M*b*. A bellows 26, shown diagrammatically, is provided to mask the portion of the window 15 comprised between the screens 16*a*, 16*b* when the latter are separated from one another. In the same way, extendable shutters [not shown] are provided between the screens 16*a*, 16*b* and the block 14 to mask the zones of the window 15 situated on both sides of the screens 16*a*, 16*b*.

It will be noted that the adjustment of the separation of the screens 16*a*, 16*b* can be obtained by means of methods very different from those shown in FIG. 2. For example instead of providing a relative displacement of the screens 16*a*, 16*b*, there could be provided several sets of double screens 16*a*, 16*b*, fixed with respect to one another, but whose separation, from one set to the other, would be different. In this case, the block 14 would comprise means enabling the rapid mounting and dismounting of a set of screens. Thus, by substituting for a first set, in which the screens 16*a*, 16*b* are fixed with respect to one another and separated by a certain distance, another set, in which the screens 16*a*, 16*b* are again fixed with respect to one another but separated by a different distance from that of the first set, there would be produced in a way an adjustment by discrete values of the separation of the screens 16*a*, 16*b*.

The separation E of the projection centers 4*a*, 4*b*, for a given enlargement, depends on the conditions of recording the photographs P*a*, P*b*, and especially on the distance separating the positions occupied by the objective of the taking apparatus at the moment of recording the photographs, this distance being generally called "base".

If this base remained rigorously constant, the separation E of the centers of projection 4*a*, 4*b* would remain constant and the projectors 3*a*, 3*b* could be mounted fixed with respect to one another. However, in the apparatus of the prior art, the adjustment means R already mentioned were provided to enable, especially, adjustment of the value E as a function of the variation of the base.

In an apparatus according to the invention, there is given to the separation E of the projection centers 4*a*, 4*b* a value which not only depends on the base but is increased by the separation of the marks M*a*, M*b*.

Optical means 27 with two sighting axes are provided to enable, from observation of the marks M*a*, M*b* and of the images projected of points 5*a*, 5*b* corresponding to a same portion of the subject, a stereoscopic reconstitution of a space mark and of the portion of the subject. The separation of the sighting axes V*a*, V*b* of the optical means 27 depends on that of the marks M*a*, M*b*. The separation of the axes V*a*, V*b* is such that an eye Y*a* of an observer will only see the mark M*a*, that is to say the opening 12 and the projected image of the point 5*a*, whilst the other eye Y*b* of the said observer will only see the mark M*b* and the projected image of the point 5*b*.

Preferably, optical means 27 are constituted by a stereoscope of which the separation of the sighting axes is adjustable. However, for a suitable separation of the marks M*a*, M*b*, it is not excluded for an observer to proceed with a direct observation, in which case the optical means 27 only be constituted by the two eyes of the observer.

This being the case, to produce an orthophotoplan by means of an apparatus as such as just been described, operation is as follows.

Firstly, it is ensured that the separation E of the projection centers 4*a*, 4*b* really has the value specified above, which takes into account the separation of the marks M*a*, M*b*. Then, after having arranged the sensitive surface 7 on the table 6, and after having checked that the separation of the sighting axes of the optical means 27 was correct as a function of the separation of the marks M*a*, M*b*, the sweeping of the sensitive surface 7 by movement of the aperture 12 in a plane parallel to the said surface is initiated. In regarding, by means of optical means 27, the marks M*a*, M*b* and the projected images of the two points or homologous zones 5*a*, 5*b*, of the two photographs, there is maintained constantly in coincidence, by action on the control H, the space mark seen from the two marks M*a*, M*b* and the image in relief of the portion of the subject corresponding to the projected images 5*a*, 5*b*. This coincidence in stereoscopic vision, of the space mark and of the portion of the subject, can only be obtained when, on one hand, the projected image of the point or of the zone 5*a* occurs on the slot 12 constituting the mark M*a* and, on the other hand, the projected image of the point or zone 5*b* occurs on the mark M*b*. As soon as the two above-mentioned coincidences no longer exist simultaneously, the space mark coming from the observation by the eye Y*a* of the mark M*a* and by the eye Y*b* of the mark M*b* seems to be above or below the portion of the subject. The apparatus according to the invention therefore enables control of the variations of the distance of the table 6 to the projection device 7, necessary for the production of the orthophotoplan and for the transformation of the conical projection of the terrain which constitutes one of the photographs 5*a*, 5*b* into a cylindrical projection, by the stereoscopic observation of the two separate images corresponding to a same portion of the subject. The images of the zones 5*a*, 5*b* on the table 6, being separated and the only image of the zone 5*a* overlapping the mark M*a*, that is to say the aperture 12, the sensitive surface will only be printed by the light beam coming from the projector 3*a*. There will thus be obtained an orthophotoplan of the photograph P*a* on the surface 7.

It immediately is apparent that the projector 3*a* can function in polychromatic light, and that if the photograph P*a* is in colors and if the sensitive surface 7 is adapted to give an image in colors after development, there can be obtained without difficulty an orthophotoplan in colors. It will be noted that, the aperture 12 being practically in contact with the sensitive surface 7, the maintenance of planimetric accuracy of the orthophotoplan is excellent.

It must also be stressed that the apparatus according to the invention enables the production of orthophotoplans with enlargements which are no longer limited by the bulk of the projectors 3*a*, 3*b*.

In fact, referring to FIG. 3 it is seen that, for given photographs P*a*, P*b*, the distance $p$ between these photographs and the projection centers 4*a*, 4*b* is imposed since it is equal, as explained previously, to the focal distance of the taking apparatus. Under these conditions, to obtain an orthophotoplan with a given enlargement $\gamma$ it is necessary that the projected images of the portions 5*a*, 5*b* occur at a distance $p'$ from the projection centers 4*a*, 4*b*, completely determined as a function of the known values $p$ and $\gamma$. The optical projection systems of the projectors 3*a*, 3*b* must have focal lengths such that the points or zones 5*a*, 5*b* have images situated at the distance $p'$ from the projection centers 4*a*, 4*b*. According to the diagram of FIG. 3, it is clearly apparent that, when it is desired to work with a smaller enlargement $\gamma$, that is to say when the distance $p'$ diminishes, due to the fact that the lines 5*a*, 4*a* and 5*b*, 4*b* preserve their orientation, the images 1*a*, 1*b* of the points 5*a*, 5*b* are separated from one another if the photographs P*a*, P*b* remain fixed. It is possible to maintain the separation of the images 1*a*, 1*b* constant by bringing together the photographs P*a*, P*b* until they come into abutment against one another. But, at this moment, the separation of the images 1*a*, 1*b* can no longer be maintained constant at least by overlapping the photographs P*a*, P*b*. This overlapping is undesirable since it renders unusable a portion of the photographs.

With the device according to the invention it suffices, when it is desired to work at small enlargements, to increase the separation of the marks M*a*, M*b* by an amount sufficient for the images 1*a* 1*b* of the two homologous points to come into coincidence with the two said marks M*a*, M*b*. Naturally, as soon as the separation of the marks M*a*, M*b* is modified, the separation of the sighting axes of the optical means 27 is modified in consequence.

The apparatus according to the invention, whilst being of simple construction, hence enables the production of orthophotoplans in colors with a good planimetric accuracy. The apparatus enables also the production of orthophotoplans with small enlargements.

As is self evident and is already emerges from the foregoing, the invention is in no way limited to those of its methods of application, nor to those methods of production of its various parts, which have been more especially indicated; it encompasses, on the contrary, all variations.

I claim:

1. Apparatus for producing orthophotoplans comprising:

an optical projection device for a stereoscopic pair of photographs of the subject, comprising two projection centers, a support, adapted to bear a sensitive surface, means for adjusting the distance from the support to the projection device, a receiving device for images of the portions of the photographs corresponding to a same portion of the subject, which receiving device is situated in the vicinity of the support, between the latter and the projection device, and is adapted to be moved with the support, an exposure device for successive adjacent zones of the sensitive surface, comprising an aperture provided in the receiving device, wherein the receiving device comprises two distinct visible marks, separated from one another in a direction parallel to the line joining the projection centers, the midpoints of the marks being aligned parallel to the projection centers, one of said marks being constituted by said aperture, the separation of the projection centers, for a given enlargement is equal to a distance, depending on the conditions of recording the photographs, increased by the separation of the marks and optical means, with two sighting axes and separation means for said optical means controlled by the separation of said marks, enabling, a stereoscopic reconstitution of one space mark and of a portion of the subject, whereby, at the moment when the observer produces coincidence between said one space mark and said portion of the subject, the projected images coincide with said respective marks and are hence separate, due to which, the sensitive surface is only printed by the image coincident with said aperture.

2. Apparatus according to claim 1, wherein the projection device provides beams of polychromatic light.

3. Apparatus according to claim 2, adapted to use color photographs and a sensitive surface which can provide an image in colors after development.

4. Apparatus according to claim 1, wherein the second mark is constituted by an imitation aperture of appearance identical with that of the first mark.

5. Apparatus according to claim 1, wherein the receiving device comprises means of separation adapted to prevent overlapping of the images, coming from the two photographs, on the two marks.

6. Apparatus according to claim 5, wherein said means of separation comprise an opaque shutter of which the plane is perpendicular to the line joining the midpoints of the marks the said shutter being situated between said marks.

7. Apparatus according to claim 1, wherein the receiving device comprises adjustment means for separating the marks.

8. Apparatus according to claim 7, wherein the optical means comprise adjustment means for the separation of the sighting axes.

9. Apparatus according to claim 7, wherein the adjustment means for separating the marks comprise a rod having two parts threaded in opposite senses, adapted to cooperate with nuts connected with the marks.

10. Apparatus according to claim 9, wherein the receiving device comprises a block pierced by a window in which are housed and can slide, two screens each bearing a mark and a nut.

* * * * *